United States Patent [19]

Yamasaki et al.

[11] Patent Number: 5,183,871
[45] Date of Patent: Feb. 2, 1993

[54] STYRENE POLYMER MOLDING MATERIAL AND PROCESS FOR PREPARING SAME

[75] Inventors: Komei Yamasaki, Chiba; Funaki Keisuke, Ichihara, both of Japan

[73] Assignee: Idemitsu Kosan Co., Ltd., Tokyo, Japan

[21] Appl. No.: 523,065

[22] Filed: May 14, 1990

[30] Foreign Application Priority Data

May 31, 1989 [JP] Japan ................................. 135940

[51] Int. Cl.$^5$ ............................................. C08L 25/04
[52] U.S. Cl. .................................. 526/347.2; 526/346; 528/503; 524/120; 524/577; 525/241; 264/210.1; 264/331.17
[58] Field of Search .................. 528/503, 502; 526/347.2, 346; 524/577; 264/210.1, 331.17; 525/241

[56] References Cited

U.S. PATENT DOCUMENTS 4,680,353 7/1987 Ishihara et al. ................... 526/160
5,006,296 4/1991 Pedersen ........................... 264/76.1

FOREIGN PATENT DOCUMENTS 0291915 11/1988 European Pat. Off. .
0328975 8/1989 European Pat. Off. .
0356856 3/1990 European Pat. Off. .

OTHER PUBLICATIONS

Structure and Properties of Polymers, Boenig, Wiley and Sons, N.Y., 195 (1973).
Tadmor et al., Principles of Polymer Processing, Wiley-Interscience, N.Y., 64–5, 1979.

Primary Examiner—Fred Teskin
Attorney, Agent, or Firm—Oblon, Spivak, McClelland, Maier & Neustadt

[57] ABSTRACT

Disclosed are a styrene polymer molding material which has a high degree of syndiotacticity, a weight average molecular weight of 50,000 or more, and at least one melting points of 285° C. or higher, and a process for producing the same by melting a styrene polymer having a high degree of syndioacticity and then molding it under a stress of $1 \times 10^6$ dyne/cm$^2$ or higher.

The styrene polymer molding material of the present invention has excellent heat resistance. In addition, according to the process of the present invention, the above polymer molding material having excellent heat resistance can be prepared by a simple operation, and thus has marked advantages for practical use.

13 Claims, 1 Drawing Sheet

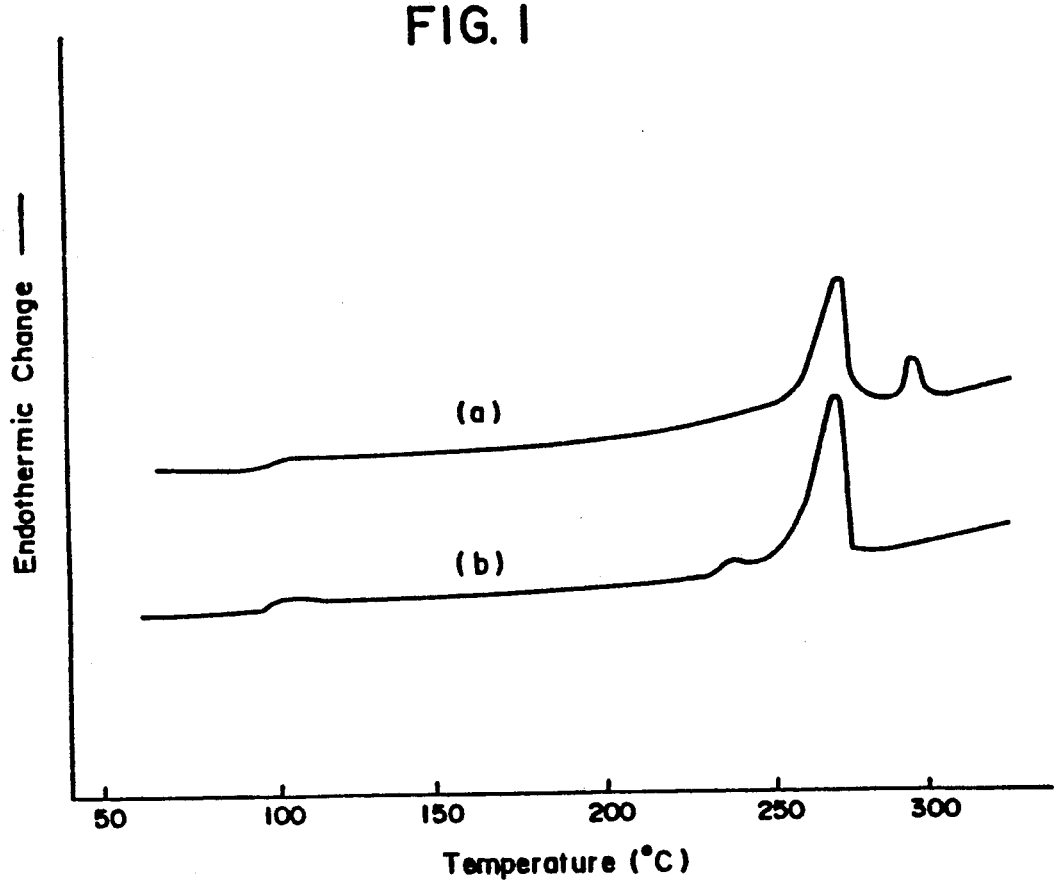

STYRENE POLYMER MOLDING MATERIAL AND PROCESS FOR PREPARING SAME

BACKGROUND OF THE INVENTION

1. Field of the invention

This invention relates to a styrene polymer molding material and a process for producing the same, and more particularly it relates to a styrene polymer molding material which is available as an industrial materials providing excellent heat resistance and a process for producing the same with good efficiency.

2. Description of Related Arts

Styrene polymers which have heretofore been conventionally used were obtained by radical polymerization and have an atactic configuration in their stereoregularity and also are amorphous. These polystyrenes having an atactic configuration have been put to various uses. However, their heat resistance is low and solvent resistance is poor. Therefore, it has been desired to improve their physical properties.

The group of the present inventors, previously developed a styrene polymer having a high degree of syndiotacticity which is expected to be utilized for various uses because it has relatively high crystallinity and a high melting point as compared with conventional atactic polystyrenes, and has excellent heat resistance and solvent resistance. In particular, utilization for an electrical insulating material is expected to be promising. However, the conventional syndiotactic polystyrenes have a melting point of not more than 270° C. so that those which can be directly contacted with high temperature solder are difficult to prepare, even when specific treatments such as thermal resistance treatments are applied (Japanese Patent Application Laid-Open Nos. 244257/1986 and 182348/1989).

Thus, the group of the present inventors has proposed various treatment methods such as electron beam treatment (Japanese Patent Application Laid-Open No. 34647/1990), and solvent treatment (Japanese Patent Application Laid-Open No. 64141/1990), but in order to use the above methods industrially, new instrument are required.

SUMMARY OF THE INVENTION

An object of the present invention is to provide a styrene polymer (or a vinyl aromatic polymer) molding material having a high degree of syndiotacticity and high heat resistance.

Another object of the present invention is to provide a process for efficiently producing a molding material of styrene polymer having a high degree of syndiotacticity.

Consequently, the present inventors have carried out intensive studies to develop a styrene polymer molding material having a high degree of syndiotacticity which does not dissolve or soften, even when contacted directly with high temperature solder, and which has better heat resistance. As a result, it has been found that, when such styrene polymer having a high degree of syndiotacticity is molded under a stress of $1 \times 10^6$ dyne/cm$^2$ or more after melting, a part or all of the molded material has a higher melting point. The present invention is based on such findings.

The present invention provides a molding material of styrene polymer having a high degree of syndiotacticity, a weight average molecular weight of 50,000 or higher, and at least one melting point of 285° C. or higher.

In addition, the present invention also provides a process for producing the molding material which comprises melting the styrene polymer having a high degree of syndiotacticity and then molding the molten polymer under a stress of $1 \times 10^6$ dyne/cm$^2$ or higher.

BRIEF DESCRIPTION OF THE DRAWING

FIG. 1 is a graph showing the results measured with a differential scanning calorimeter for styrene polymer molding materials obtained in Example 1 and Comparative example 1.

DESCRIPTION OF THE PREFERRED EMBODIMENTS

In the present invention, the styrene polymer to be used for a starting material of a molding material has a high degree of syndiotacticity. Here, the styrene polymer having a high degree of syndiotacticity means that its stereochemical structure is a highly syndiotactic configuration, i.e. the stereostructure in which phenyl groups or substituted phenyl groups as side chains are located alternately in opposite directions (racemic isomer) relative to the main chain consisting of carbon-carbon bonds. The tacticity is quantitatively determined by the nuclear magnetic resonance method ($^{13}$C-NMR method) using a carbon isotope. The tacticity, as determined by the $^{13}$C-NMR method, can be indicated in terms of the proportions of structural units continuously connected to each other, i.e. a diad in which two structural units are connected to each other, a triad in which three structural units are connected to each other and a pentad in which five structural units are connected to each other. Styrene polymers having a high degree of syndiotacticity are polystyrene, poly(alkylstyrene), poly(halogenated styrene) and mixtures thereof, and copolymers mainly comprising these that usually have a proportion of racemic diad is usually at least 75% and preferably at least 85%, or proportions of racemic pentad of at least 30% and preferably at least 50%.

As described above, in the styrene polymers of the present invention, copolymers of other monomer(s) and the styrene monomer(s) are also included, as long as they do not hinder the object of the present invention to be established. Here, the other monomers include olefins such as ethylene and propylene, dienes such as butadiene and isoprene, or polar vinyl monomers such as methyl methacrylate, and the content thereof in the copolymer is 50% or less, preferably 30% or less.

The above poly(alkylstyrene) includes poly(methylstyrene), poly(ethylstyrene), poly(isopropylstyrene) and poly(tert-butylstyrene), and the poly(halogenated styrene) includes poly(chlorostyrene), poly(bromostyrene) and poly(fluorostyrene). Of these, particularly preferred styrene polymers include polystyrene, poly(p-methylstyrene), poly(m-methylstyrene), poly(p-tert-butylstyrene), poly(p-chlorostyrene), poly(m-chlorostyrene), poly(p-fluorostyrene), and a copolymer of styrene and p-methylstyrene (Japanese Patent Laid-Open Application No. 187708/1987).

The molecular weight of the styrene polymer used in the present invention is not critical, but the weight average molecular weight is preferably at least 50,000, particularly at least 100,000. The spread of the molecular weight distribution is not critical, and various ones can be applied. The styrene polymer having a high degree of syndiotacticity has a melting point of 160° to 275° C. and excellent heat resistance compared with the conventional styrene polymer having an atactic configuration.

A styrene polymer having a high degree of syndiotacticity can be obtained, for example, by polymerizing a styrene monomer (corresponding to the desired styrene polymer) with a catalyst comprising a titanium compound and a condensate of water and trialkylaluminum, such as alkylaluminoxane, in the presence or absence of an inert hydrocarbon solvent. Furthermore, the styrene (co)polymer as a starting material, can be converted into a (co)polymer having the desired stereoregularity and a reactive substituent(s) by fractionation, blending or organic synthetic means.

The molded material of the present invention can be obtained by molding the above styrene polymer. Thermoplastic resins, rubbers, inorganic fillers, antioxidants, nucleating agents, plasticizers, solubilizing agents, colorant, antistatic agents and the like can be added to the styrene polymer provided they do not impair the object of the present invention.

Here, various antioxidants can be used, but particularly preferred are phosphorus antioxidants including monophosphites and diphosphites such as tris(2,4-di-t-butylphenyl)phosphite, tris(mono and di-nonylphenyl)phosphite and the like, and phenolic antioxidants. Preferred diphosphites are the phosphorus compounds represented by the formula:

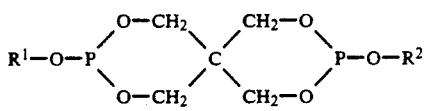

wherein $R^1$ and $R^2$ are each an alkyl group having 1 to 20 carbon atoms, a cycloalkyl group having 3 to 20 carbon atoms, or an aryl group having 6 to 20 carbon atoms.

Typical examples of the phosphorus compounds represented by the above formula are distearylpentaerythritol diphosphite, dioctylpentaerythritol diphosphite, diphenylpentaerythritol diphosphite, bis(2,4-di-tert-butylphenyl)pentaerythritol diphosphite, bis(2,6-di-tert-butyl- 4-methylphenyl)pentaerythritol diphosphite, dicyclopentaerythritol diphosphite and the like.

As phenolic antioxidant, various known compounds can be used. Representative examples are 2,6-di-tert-butyl-4-methylphenol, 2,6-diphenyl-4-methoxyphenol, 2,2'-methylenebis(6-tert-butyl-4-methylphenol), 2,2'-methylenebis (4-methyl-6-(α-methylcyclohexyl)-phenol), 1,1-bis(5-tert-butyl-4-hydroxy-2-methylphenyl)butane, 2,2'-methylenebis(4-methyl-6-cyclohexylphenol), 2,2'-methylenebis-(4-methyl-6-nonylphenol), 1,1,3-tris-(5-tert-butyl-4-hydroxy-2-methylphenyl)butane, 2,2-bis-(5-tert-butyl-4-hydroxy-2-methylphenyl)-4-n-dodecylmercaptobutane, ethyleneglycol-bis (3,3-bis(3-tert-butyl-4-hydroxyphenyl)butyrate), 1,1-bis(3,5-dimethyl-2-hydroxyphenyl)-3-(n-dodecylthio)-butane, 4,4'-thiobis(6-tert-butyl-3-methylphenol), 1,3,5-tris(3,5-di-tert-butyl-4-hydroxybenzyl)-2,4,6-trimethylbenzene, 2,2-bis(3,5-di-tert-butyl-4-hydroxybenzyl)malonic acid dioctadecyl ester, n-octadecyl-3-(4-hydroxy-3,5-di-t-butylphenyl)propionate, and tetrakis (methylene(3,5-di-tert-butyl-4-hydroxyhydrocinnamate))methane.

The above antioxidant can be compounded in 0.0001 to 2 parts by weight, preferably 0.001 to 1 part by weight per 100 parts by weight of the styrene polymer having a high degree of syndiotacticity as mentioned above.

If the amount of the antioxidant compounded is less than 0.0001 part by weight, an insufficient effect is obtained because the molecular weight drops sharply. If it exceeds 2 parts by weight, on the other hand, mechanical strength is adversely affected.

In addition, example of the thermoplastic resin are styrene polymers including polystyrene having an atactic configuration, polystyrene having an isotactic configuration, AS resin and ABS resin, polyesters including polyethylene terephthalate, polycarbonates, polyphenylene oxides, polysulfones, polyethers including polyether sulfone, condensed series polymer including polyamides, polyphenylene sulfides (PPS) and polyoxymethylenes, acrylic series polymers including polyacrylic acids, polyacrylates and poly(methyl methacrylate)s, polyolefins including polyethylene, polypropylene, polybutene, poly(4-methylpentene-1) and ethylene-propylene copolymer, halogen-containing vinyl compound copolymers including poly(vinyl chloride), poly(vinylidene chloride) and poly(vinylidene fluoride).

In addition, various rubbers can be used and rubber-like copolymers containing a styrene compound as one component are most preferred. Examples are rubbers obtained by partially or fully hydrogenating the butadiene portion of a styrene-butadiene block copolymer (SEBS), styrene-butadiene copolymer rubber (SBR), methyl acrylate-butadiene-styrene copolymer rubber, acrylonitrile-butadiene-ethylene copolymer rubber (ABS rubber) acrylonitrile-alkyl acrylate-butadiene-styrene copolymer rubber (AABS), methyl methacrylate-alkyl acrylate-styrene copolymer rubber (MAS) and methyl methacrylate-alkyl acrylate-butadiene-styrene copolymer rubber (MABS). These rubber-like copolymers containing a styrene compound as one component have good dispersibility in the styrene polymers having a high degree of syndiotacticity, because they have the styrene unit and, therefore, can markedly improve physical properties.

Other rubbers which can be be used include natural rubber, polybutadiene, polyisoprene, polyisobutylene, neoprene, ethylene-propylene copolymer rubber, polysulfide rubber, thiokol rubber, acrylic rubber, urethane rubber, silicone rubber, epichlorohydrin rubber, polyether ester rubber, and polyester ester rubber.

The state of the inorganic filler is not critical and may be fibrous, granular or powdery. Examples of a fibrous inorganic filler are glass fibers, carbon fibers, and alumina fibers. Examples of granular or powdery inorganic fillers are talc, carbon black, graphite, titanium dioxide, silica, mica, calcium carbonate, calcium sulfate, barium carbonate, magnesium carbonate, magnesium sulfate, barium sulfate, oxysulfate, tin oxide, alumina, kaolin, silicon carbide, and metal powder.

In order to prepare the molding material of the present invention, these styrene polymer or compositions thereof are melted and then molded. The heating temperature for melting is not particularly limited but is preferably in the range of 260° to 340° C. If it is less than 260° C., the styrene polymer is difficult to melt and almost impossible to mold. On the other hand, if it exceeds 340° C., undesirable lowering of the molecular weight due to decomposition, coloring and foaming is likely to occur.

According to the process of the present invention, when the styrene polymer or composition thereof thus melted is molded under stress of $1\times10^6$ dyne/cm$^2$ or higher, preferably $1\times10^7$ dyne/cm$^2$ or higher, a styrene polymer molding material having a high degree of syndiotactic configuration, the melting points at least one of which is 285° C. or higher and further improved heat resistance can be obtained.

The stress applied at molding differs depending on the molding method, but in the case of melt spinning, it is preferred to stretch it with a stress of $1\times10^7$ dyne/cm$^2$ or more immediately after the melt extrusion. In the case of injection molding, etc., molding is also preferably carried out under conditions of a shear stress in a cavity of $5\times10^6$ dyne/cm$^2$ or more.

When the molding temperature, molecular weight of the styrene polymer, melt viscosity of the styrene polymer composition, deformation rate such as shear rate or draw rate etc. are controlled, molding can be carried out under the stress within the range described above.

The styrene polymer molding material of the present invention thus obtained is retained in a syndiotactic configuration and its melting point is increased to 285° to 300° C. whereby its heat resistance is markedly improved compared with the conventional styrene polymer having syndiotactic configuration. The molding material mentioned in the present invention refers to an injection molding material, a sheet, a film, a fibrous state material, as well as a pellet which is made by cutting a strand.

In addition, when the resulting molding material is thick, a sufficient amount of stress may not reach the inner portion at molding, and the inner portion becomes a molding material of a styrene polymer having a conventional syndiotactic configuration with a melting point of 260° to 270° C. and sometimes may have a melting point of 260° C. or less in more than one part. However, the surface layer or subsurface parts thereof is markedly improved in terms of heat resistance and a composite material having a surface with excellent heat resistance and a melting point of 285° C. or higher can be obtained.

As state above, the styrene polymer molding material having a high degree of syndiotacticity of the present invention has phase transition points, at least one of which is 285° C. or higher and excellent heat resistance compared with a molding material obtained by the conventional styrene polymer having a syndiotactic configuration.

According to the process of the present invention, the above polymer molding material having excellent heat resistance can also be prepared by a simple operation and thus it is markedly advantageous for practical use.

Accordingly, the polymer molding material of the present invention can be applied to wide range of uses as an industrial material. In particular, it can be put into direct contact with a high-temperature solder because it has high insulating property and heat resistance. Therefore, it can be effectively utilized for electric parts such as electric insulating material.

The present invention is described in greater detail with reference to the following examples.

PRODUCTION EXAMPLE

(1) Preparation of Aluminoxane

Two hundred milliliters of toluene was placed in a reactor, and 47.4 milliliters (0.492 mole) of trimethylaluminum and 35.5 grams (0.142 mole) of copper sulfate pentahydrate were added thereto and reacted at 20° C. for 24 hours. Then, the solid portion was removed from the reaction mixture to obtain a toluene solution containing 12.4 grams of methylaluminoxane.

(2) Production of Styrene Polymer

Synthesis Example 1

Two liters of toluene as a solvent, and 5 millimoles of tetraethoxytitanium and 500 millimoles of methylaluminoxane obtained in (1) above (as aluminum atom) as catalyst components were placed in a reactor, and then 15 liters of styrene was added at 50° C., and plymerized for 4 hours.

After polymerization, the reaction product was washed with a mixture of hydrochloric acid and methanol to decompose and remove the catalyst components, and then it was dried to obtain 2.5 kilograms of a styrene polymer (polystyrene). Next, the polymer was subjected to Soxhlet extraction using methyl ethyl ketone as a solvent to obtain 95% by weight of an extraction residue. The weight average molecular weight of the polymer residue was 800,000. A nuclear magnetic resonance spectral analysis of the said polymer using carbon isotope ($^{13}$C-NMR) showed a signal at 145.35 ppm, which was ascribable to its syndiotactic configuration, and syndiotacticity in terms of racemic pentad as calculated from the peak area was 96%.

Synthesis Example 2

326 milliliters of toluene as a solvent, 0.15 millimole of tetraethoxytitanium, and 15 millimoles of methylaluminoxane obtained in (1) above (as aluminum atom) as catalyst components were placed in a reactor, and then 1.463 moles of styrene and 0.038 mole of p-methylstyrene were added at 40° C., and polymerized for 2 hours.

After polymerization, the reaction product was washed with a mixture of hydrochloric acid and methanol to decompose and remove the catalyst components, and then it was dried to obtain 10 grams of a polymer. The weight average molecular weight of the polymer was 620,000 and the melting point was 255° C. A $^{13}$C-NMR of the polymer was measured using 1,2,4-trochlorobenzene as a solvent showed signals at 145.11 ppm, 145.2 ppm and 142.09 ppm, which was ascribable to the cosyndiotactic configuration described in Japanese Patent Application Laid-Open No. 17973/1987.

Synthesis Example 3

Two liters of toluene as a solvent, and 5 millimole of tetraethoxytitanium and 500 millimoles of methylaluminoxane obtained in (1) above (as aluminum atom) as catalyst components were placed in a reactor, and then 15 liters of styrene was added at 35° C., and polymerized for 4 hours.

After polymerization, the reaction product was washed with a mixture of hydrochloric acid and methanol to decompose and remove the catalyst components, and then dried to obtain 2.5 kilograms of a styrene series polymer (polystyrene).

Next, the polymer was subjected to Soxhlet extraction using methyl ethyl ketone as a solvent to obtain 97% by weight of an extraction residue. The weight average molecular weight of the polymer residue was 400,000. A $^{13}$C-NMR analysis of the said polymer showed a signal at 145.35 ppm, which was ascribable to the syndiotactic configuration, and the syndiotacticity in terms of racemic pentad as calculated from the peak area was 98%.

Synthesis Example 4

Two liters of toluene as a solvent, and 1 millimole of cyclopentadienyltitanium trichloride and 0.6 moles of methylaluminoxane obtained in (1) above (as aluminum atom) as catalyst components were placed in a reactor, and then 3.6 liters of styrene was added at 20° C., and polymerized for 1 hour.

After polymerization, the reaction product was washed with a mixture of hydrochloric acid and methanol to decompose and remove the catalyst components, and then dried to obtain 330 grams of a polymer.

Next, the polymer (polystyrene) was subjected to Soxhlet extraction using methyl ethyl ketone as a solvent to obtain 95% by weight of an extraction residue. The weight average molecular weight of the polymer residue was 290,000, the number average molecular weight of the same was 153,000 and the melting point was 270° C. A $^{13}$C-NMR analysis of the said polymer showed a signal at 145.35 ppm, which was ascribable to the syndiotactic configuration, and the syndiotacticity in terms of racemic pentad as calculated from the peak area was 96%.

EXAMPLE 1

To 100 parts by weight of the styrene polymer (polystyrene) having syndiotactic configuration obtained in Synthesis example 1 above were added 0.7 part by weight of (2,6-di-tert-butylmethylphenyl)pentaerythritol diphosphite (trade name: PEP-36, produced by Adeca Agus Chemical Co.) and 0.1 part by weight of tetrakis (methylene-3-(3,5-di-tert-butyl-4-hydroxyphenyl)propionate) methane (trade name: Irganox 1010, produced by Nippon Ciba Geigy Co.) as antioxidants, and the mixture was spun from a die at a temperature of 310° C. and at a spinning rate of 78 m/min. The shear stress at this time was $3.7 \times 10^7$ dyne/cm$^2$ to give a fibrous molding material having a diameter of 116 μm. This fibrous molding material was measured using a differential scanning calorimeter (DSC - II, manufactured by Perkin Elmer Co.) with a temperature raising rate of 20° C./min. The result is shown by curve (a) in FIG. 1. As can be clearly seen from the figure, melting points (phase transition points) are independently present at 293° C. and 267° C., and it can be understood that the melting point of 293° C. is a high temperature which could never be observed with the conventional styrene polymer. Signals measured by $^{13}$C-NMR analysis of the molding material were the same as those of the starting polymer powder (the styrene polymer obtained in Synthesis example 1).

EXAMPLE 2

The same procedure was carried out as in Example 1 except that the styrene polymer obtained in Synthesis example 2 was used and the die temperature was changed to 295° C. The results are shown in Table 1.

EXAMPLE 3

By using the styrene polymer obtained in Synthesis example 3, antioxidants are mixed in the same manner as in Example 1. The mixture was pelletized after melting at 300° C.

These pellets were injection molded to obtain a molding material 1 mm thick, 25 mm wide and 220 mm long.

The injection time at this procedure was 1 second, the resin temperature was 270° C. and the mold temperature was 30° C. In addition, the shear stress calculated at a vicinity of the inner wall of the cavity was $2 \times 10^7$ dyne/cm$^2$. When a section of the molding material was observed through an optical microscope, a crystal layer was observed at the surface.

This molding material was heat-treated at 180° C. for 10 minutes. When the molding material was measured by a differential scanning calorimeter, melting points (phase transition points) were observed at 293° C. and 271° C. Because the ratio of the peak areas and the volume ratio of the surface layer observed by the previous observation are substantially the same, it can be confirmed that a layer having a high melting point of 293° C. and having high heat resistance is formed at the surface.

EXAMPLE 4

To the styrene polymer obtained in Synthesis example 1 were mixed antioxidants in the same manner as in Example 1, and the mixture was pelletized after being melted at 300° C.

These pellets were inflation molded. Inflation molding was carried out from a circular die having an inner diameter of 40 mm at a melting temperature of 310° C., an extrusion blow-up ratio of 2, and a drawing ratio of 100 m/min.

Melting points of the resulting film state molding material are shown in Table 1.

Comparative Example 1

By using the styrene polymer obtained in Synthesis example 4, a fibrous molding material was prepared in the same manner as in Example 1.

The temperature of a dice at this time was set to 280° C. with a drawing rate of 10 m/min. The resulting molding material was measured by a differential scanning calorimeter and the result is shown in FIG. 1 (b). The molding conditions and the melting point of the molding material are also shown in Table 1.

Comparative Example 2

The melting point of powder of the styrene polymer obtained in Synthesis example 3 was measured by a differential scanning calorimeter. The result is shown in Table 1.

TABLE 1

| | Example 1 | Example 2 | Example 3 | Example 4 | Comparative example 1 | Comparative example 2 |
|---|---|---|---|---|---|---|
| Resin[1] | SPS | SP (St-p-MeSt) | SPS | SPS | SPS | SPS |
| Weight average[2] molecular weight | 800,000 | 600,000 | 400,000 | 800,000 | 290,000 | 400,000 |
| Molding method | Melt spinning | Melt spinning | Injection molding | Inflation molding | Melt spinning | (Powder) |
| Stress[3] dyne/cm$^2$ | $3.7 \times 10^7$ [4] | $1.7 \times 10^7$ [4] | $2.0 \times 10^7$ [5] | $1.2 \times 10^7$ [4] | $5.6 \times 10^3$ [4] | 0 |
| Molding material | Fibrous | Fibrous | Rectangular* | Film | Fibrous | — |

TABLE 1-continued

|  | Example 1 | Example 2 | Example 3 | Example 4 | Comparative example 1 | Comparative example 2 |
|---|---|---|---|---|---|---|
| Phase transfer[6] point (°C.) | 270 291 | 255 291 | 271 293 | 269 291 | 270 — | 271 — |

[1]SPS: Syndiotactic polystyrene, SP (St-p-MeSt): Syndiotactic (styrene-para-methylstyrene) copolymer (containing 5 mole % of para-methylstyrene)
[2]Measured by gel permeation chromatography (GPC) using 1,2,4-trichlorobenzene as a solvent at 135° C.
[3]Stress calculated from the molding conditions and molding material.
[4]Stress to the direction of drawing.
[5]Shear stress
[6]Measured by a differential scanning calorimeter (DSC).
*Rectangular parallelopiped

What is claimed is:

1. A molding material of styrene polymer having a high degree of syndiotacticity, a weight average molecular weight of 50,000 or more, and at least one melting point in the surface layer or subsurface parts thereof of the molding material in the range of 285° C. to 300° C. and, if present, an inner portion having a conventional syndiotactic configuration and a melting point no higher than 275° C., as measured by differential scanning calorimeter with a temperature rising rate of 20° C./min.

2. The molding material according to claim 1, wherein the said syndiotacticity measured by a nuclear magnetic resonance method using a carbon isotope is a stereoregularity having 30% or more of racemic pentad.

3. The molding material according to claim 2, wherein the said syndiotacticity is a stereoregularity having 50% or more of racemic pentad.

4. The molding material according to claim 1, wherein the said styrene polymer is a styrene homopolymer or a styrene copolymer containing 50 mole % or more of styrene unit.

5. The molding material according to claim 4, wherein the said styrene polymer is a styrene homopolymer.

6. The molding material according to claim 4, wherein the said styrene polymer is a styrene copolymer containing 70 mole % or more of styrene unit.

7. The molding material according to claim 1, wherein the said styrene polymer has a weight average molecular weight of 100,000 or more.

8. A process for producing a molding material of styrene polymer according to claim 1, which comprises melting a styrene polymer having a high degree of syndiotacticity and thereafter molding the styrene polymer under a stress of $1 \times 10^6$ dyne/cm$^2$ or higher.

9. The process according to claim 8, wherein the said molding material is composed of a styrene polymer having a high degree of syndiotacticity and at least one of a thermoplastic resin, a rubber, an inorganic filler, an antioxidant, a nucleating agent, a plasticizer, a solubilizing agent, a colorant and an antistatic agent.

10. The process according to claim 8, wherein the said styrene polymer having a high degree of syndiotacticity is melted at 260° to 340° C.

11. The process according to claim 8, wherein the said molding is carried out under a stress of $1 \times 10^7$ dyne/cm$^2$ or higher.

12. The process according to claim 8, wherein the said molding is carried out by melt spinning under a stress of $1 \times 10^7$ dyne/cm$^2$ or higher in the stretching direction.

13. The process according to claim 8, wherein said molding is carried out by an injection molding under a shear stress in a cavity of $5 \times 10^6$ dyne/cm$^2$ or higher.

* * * * *